T. B. ARMSTEAD.
Device for Removing Obstructions from Waste-Pipes.
No. 220,330. Patented Oct. 7, 1879.
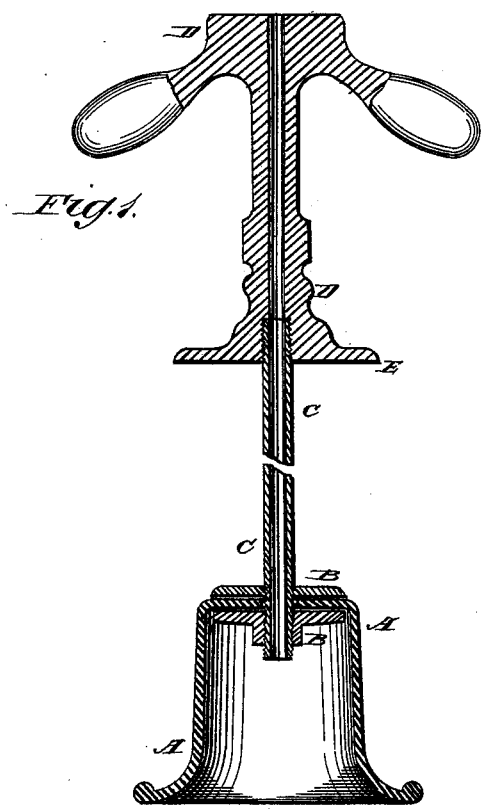
Fig. 1.
Fig. 2.
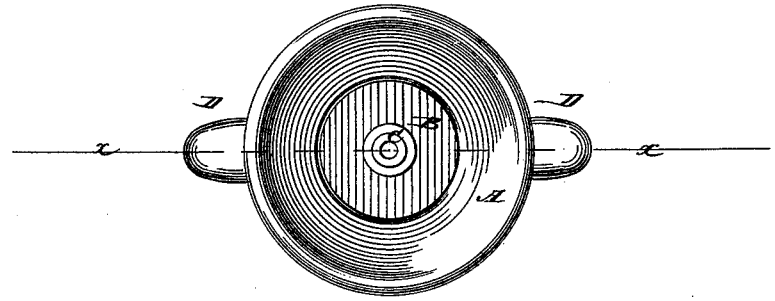
WITNESSES:
INVENTOR:
T. B. Armstead
BY Munn & Co
ATTORNEYS.

UNITED STATES PATENT OFFICE.

TASWILL B. ARMSTEAD, OF NEW YORK, ASSIGNOR TO HIMSELF, JOHN CHRISTIE, OF SAME PLACE, AND ANTHONY T. BISSETT, OF BROOKLYN, N. Y.

IMPROVEMENT IN DEVICES FOR REMOVING OBSTRUCTIONS FROM WASTE-PIPES.

Specification forming part of Letters Patent No. 220,330, dated October 7, 1879; application filed April 24, 1879.

*To all whom it may concern:*

Be it known that I, TASWILL B. ARMSTEAD, of the city, county, and State of New York, have invented a new and useful Improvement in a Device for Removing Obstructions from Waste-Pipes, of which the following is a specification.

Figure 1 is a longitudinal section of my improved device, taken through the line $xx$, Fig. 2. Fig. 2 is a bottom view of the same.

Similar letters of reference indicate corresponding parts.

The object of this invention is to furnish an improved implement for removing obstructions from the waste-pipes of water-closets, bath-tubs, wash-bowls, sinks, &c., and which shall be simple in construction, convenient and effective in operation, and inexpensive in manufacture.

The invention consists in the combination of the tube and the two disks with the rubber cup, and the perforated handle provided with a disk at the lower end of its shank, as hereinafter fully described.

A represents a bell-shaped cup of rubber, the bottom of which is clamped between two disks, B, of metal, which are screwed upon the lower end of a tube, C. The upper end of the tube C is screwed into the hole at the lower end of the shank of the handle D, which is so formed that the hand, when in the natural position for using the implement, may close the hole at the upper end of the handle. The tube C should be a foot and a half (more or less) in length for clearing the waste-pipes of water-closets; but for clearing the waste-pipes of bath-tubs, wash-bowls, sinks, &c., it may be made shorter.

Upon the lower end of the shank of the handle D is formed a circular disk, E, to serve as a fender to prevent the water from dashing against the hand when using the implement.

In using the implement for clearing the waste-pipes of water-closets, the handle D is grasped by the hand in such a way that the hand may cover and close the hole at the upper end of the said handle, the water is turned on, and the implement is moved rapidly up and down through the said waste-pipe until the obstruction is loosened and forced through into the sewer. The hand is then adjusted so as to allow the air to pass down through the tube C, and the implement can be readily withdrawn from the said waste-pipe.

In using the implement for clearing the waste-pipes of bath-tubs, wash-bowls, sinks, &c., the water is turned on, the rubber cup A is placed over the waste-hole, and the handle D is moved rapidly up and down until the obstruction is removed.

Having thus described my invention, I claim as new and desire to secure by Letters Patent—

The combination of a rubber cup and tubular handle, the two connected by a pipe that opens into each, as shown and described, for the purpose specified.

TASWILL B. ARMSTEAD.

Witnesses:
J. H. SCARBOROUGH,
C. SEDGWICK.